(12) United States Patent
Gaddam et al.

(10) Patent No.: US 9,397,779 B2
(45) Date of Patent: Jul. 19, 2016

(54) METHOD OF PACKET RETRANSMISSION AND RECEPTION AND WIRELESS DEVICE EMPLOYING THE SAME

(75) Inventors: Vasanth Gaddam, Tarrytown, NY (US); Monisha Ghosh, Chappaqua, NY (US); Jianfeng Wang, Ossining, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 131 days.

(21) Appl. No.: 12/812,640

(22) PCT Filed: Jan. 23, 2009

(86) PCT No.: PCT/IB2009/050282
§ 371 (c)(1),
(2), (4) Date: Jul. 13, 2010

(87) PCT Pub. No.: WO2009/095831
PCT Pub. Date: Aug. 6, 2009

(65) Prior Publication Data
US 2010/0284340 A1 Nov. 11, 2010

Related U.S. Application Data

(60) Provisional application No. 61/024,316, filed on Jan. 29, 2008.

(51) Int. Cl.
| | |
|---|---|
| *H04W 40/00* | (2009.01) |
| *H04J 11/00* | (2006.01) |
| *H04B 7/00* | (2006.01) |
| *H04L 27/28* | (2006.01) |
| *H04L 1/00* | (2006.01) |
| *H04L 1/18* | (2006.01) |
| *H04L 5/00* | (2006.01) |

(52) U.S. Cl.
CPC ............ *H04L 1/0001* (2013.01); *H04L 1/0071* (2013.01); *H04L 1/1867* (2013.01); *H04L 5/0007* (2013.01); *H04L 5/0044* (2013.01)

(58) Field of Classification Search
None
See application file for complete search history.

(56) References Cited

U.S. PATENT DOCUMENTS

| | | | | |
|---|---|---|---|---|
| 7,095,812 | B2* | 8/2006 | Chan et al. | 375/341 |
| 7,359,313 | B2* | 4/2008 | Chan et al. | 370/210 |
| 7,502,408 | B2* | 3/2009 | Kim et al. | 375/219 |
| 7,523,382 | B2* | 4/2009 | Kim et al. | 714/776 |
| 7,545,873 | B2* | 6/2009 | Yoshii et al. | 375/261 |
| 7,684,756 | B2* | 3/2010 | Bohnke et al. | 455/45 |
| 7,711,060 | B1* | 5/2010 | Lou et al. | 375/267 |

(Continued)

FOREIGN PATENT DOCUMENTS

| | | |
|---|---|---|
| CN | 1694390 A | 11/2005 |
| JP | 2004112471 A | 4/2004 |

(Continued)

*Primary Examiner* — Alpus H Hsu
(74) *Attorney, Agent, or Firm* — Larry Liberchuk

(57) ABSTRACT

A first wireless device communicates data to a second wireless device. The first wireless device employs at least one of a first interleaving scheme and a first sub-carrier mapping scheme to produce a first data packet from a first plurality of data bits, and transmits the first data packet to the second wireless device. When the first data packet is not received correctly by the second wireless device, then the first wireless device employs at least one of a second interleaving scheme and a second sub-carrier mapping scheme to create a second data packet from the first plurality of data bits, and transmits the second data packet to the second wireless device.

16 Claims, 7 Drawing Sheets

(56) References Cited

U.S. PATENT DOCUMENTS

| | | | |
|---|---|---|---|
| 7,756,222 B2 * | 7/2010 | Chen et al. | 375/324 |
| 7,782,749 B2 * | 8/2010 | Yu et al. | 370/204 |
| 7,802,171 B2 * | 9/2010 | Li et al. | 714/790 |
| 7,835,696 B2 * | 11/2010 | Bohnke et al. | 455/45 |
| 7,839,761 B2 * | 11/2010 | Kim et al. | 370/204 |
| 7,893,872 B2 * | 2/2011 | Kostanic | 342/378 |
| 7,907,688 B2 * | 3/2011 | Li et al. | 375/347 |
| 7,974,358 B2 * | 7/2011 | Tsai | H04L 25/067 375/260 |
| 8,189,539 B2 * | 5/2012 | Wang | H03M 13/27 370/335 |
| 2004/0199846 A1 | 10/2004 | Matsumoto | |
| 2004/0218523 A1 * | 11/2004 | Varshney | H04B 7/2631 370/208 |
| 2005/0254556 A1 * | 11/2005 | Fujii et al. | 375/144 |
| 2006/0036924 A1 * | 2/2006 | Ghosh | 714/755 |
| 2006/0088114 A1 * | 4/2006 | Chen | H03M 13/2717 375/260 |
| 2006/0221807 A1 * | 10/2006 | Fukuoka et al. | 370/203 |
| 2007/0189151 A1 * | 8/2007 | Pan et al. | 370/210 |
| 2007/0195740 A1 * | 8/2007 | Bhushan et al. | 370/335 |
| 2007/0202816 A1 * | 8/2007 | Zheng | 455/91 |
| 2007/0211667 A1 * | 9/2007 | Agrawal et al. | 370/335 |
| 2007/0253498 A1 * | 11/2007 | Matsumoto et al. | 375/260 |
| 2007/0258529 A1 * | 11/2007 | Liang | H04L 5/023 375/260 |
| 2008/0310526 A1 * | 12/2008 | Maltsev | H04L 27/2628 375/260 |
| 2009/0022237 A1 * | 1/2009 | Wang | H04L 1/0006 375/260 |
| 2009/0175373 A1 * | 7/2009 | Kwon | H04L 1/08 375/260 |
| 2009/0180459 A1 * | 7/2009 | Orlik | H04L 5/0007 370/344 |
| 2009/0285325 A1 * | 11/2009 | Zhou | 375/267 |
| 2010/0031107 A1 * | 2/2010 | Bu et al. | 714/748 |
| 2010/0226415 A1 * | 9/2010 | Mehta et al. | 375/219 |
| 2010/0260115 A1 * | 10/2010 | Frederiksen | H04L 5/023 370/329 |
| 2010/0290561 A1 * | 11/2010 | Ko et al. | 375/298 |

FOREIGN PATENT DOCUMENTS

| | | |
|---|---|---|
| JP | 2004153354 A | 5/2004 |
| WO | WO02054603 A2 | 7/2002 |
| WO | WO2006013705 A1 | 2/2006 |
| WO | WO2007021122 A1 | 2/2007 |

* cited by examiner ies, they may be combined variously in any
METHOD OF PACKET RETRANSMISSION AND RECEPTION AND WIRELESS DEVICE EMPLOYING THE SAME A claim of priority under 35 USC §119(e) is made to U.S. Provisional Patent Application No. 61/024,316, filed on Jan. 29, 2008.

This invention pertains to the field of wireless communications, and more particularly to a method of packet retransmission and reception and a wireless device employing the same.

Many of the current wireless systems/technologies use automatic repeat request (ARQ) mechanisms to improve the probability of successful reception of a data packet.

In these systems, when ARQ is enabled, then either the same packet is retransmitted or a differently encoded packet is transmitted. Both these methods have certain drawbacks.

When the same packet is retransmitted then it does not provide any diversity gains and especially when the channel is slowly varying it is highly likely that the retransmitted packet is also in error when the original packet was received with errors. In order to overcome this problem, existing protocols use lower data rate modes after certain number of retries to improve the probability of successful reception. This method, however, reduces the overall throughput of the system.

Another method to improve the effectiveness of the retransmission scheme involves using a different coding scheme to encode the retransmitted packets. Using a different encoding scheme (and decoding scheme) will result in additional complexity and is not attractive in many cases.

Accordingly, it would be desirable to provide a method for retransmission of data that provides some measure of robustness but which requires less complexity than a system that employs different error correction encoding schemes between a first transmission of the data and a retransmission of the data. It would also be desirable to provide a method receiving data that is transmitted and retransmitted using such a method. It would still further be desirable to provide wireless devices that can employ such methods of transmission and reception.

In one aspect of the invention, a method is provided for communicating data from a first wireless device to a second wireless device. The method comprises: employing at least one of a first interleaving scheme and a first sub-carrier mapping scheme to produce a first data packet from a first plurality of data bits; and transmitting the first data packet to the second wireless device. When the first data packet is not received correctly by the second wireless device, then the method further comprises: employing at least one of a second interleaving scheme and a second sub-carrier mapping scheme to create a second data packet from the first plurality of data bits; and transmitting the second data packet to the second wireless device.

In another aspect of the invention, a method is provided for receiving data from a first wireless device at a second wireless device. The method comprises: receiving a first data packet from the first wireless device, the first data packet having been produced from a first plurality of data bits; and employing at least one of a first deinterleaving scheme and a first sub-carrier demapping scheme to create a second plurality of data bits from the first data packet. When the first data packet is not received correctly, then the method further comprises: receiving a second data packet from the first wireless device, the second data packet having been produced from the first plurality of data bits; employing at least one of a second deinter-leaving scheme and a second sub-carrier demapping scheme to produce a third plurality of data bits from the second data packet.

In yet another aspect of the invention a wireless device includes a transmitter. The transmitter is adapted to employ at least one of a first interleaving scheme and a first sub-carrier mapping scheme to create a first data packet from a first plurality of data bits; to transmit the first data packet to a second wireless device. When the first data packet is not received successfully by the second wireless device, then the transmitter is adapted to employ at least one of a second interleaving scheme and a second sub-carrier mapping scheme to create a second data packet from the first plurality of data bits; and to transmit the second data packet to the second wireless device.

In still another aspect of the invention, a wireless device includes a receiver. The receiver is adapted to receive a first data packet from the first wireless device, the first data packet having been produced from a first plurality of data bits. The receiver is adapted to employ at least one of a first deinterleaving scheme and a first sub-carrier demapping scheme to create a second plurality of data bits from the first data packet. When the first data packet is not received correctly, then the receiver is adapted to receive a second data packet from the first wireless device, the second data packet having been produced from the first plurality of data bits, and to employ at least one of a second deinterleaving scheme and a second sub-carrier demapping scheme to produce a third plurality of data bits from the second data packet.

Figure 1:
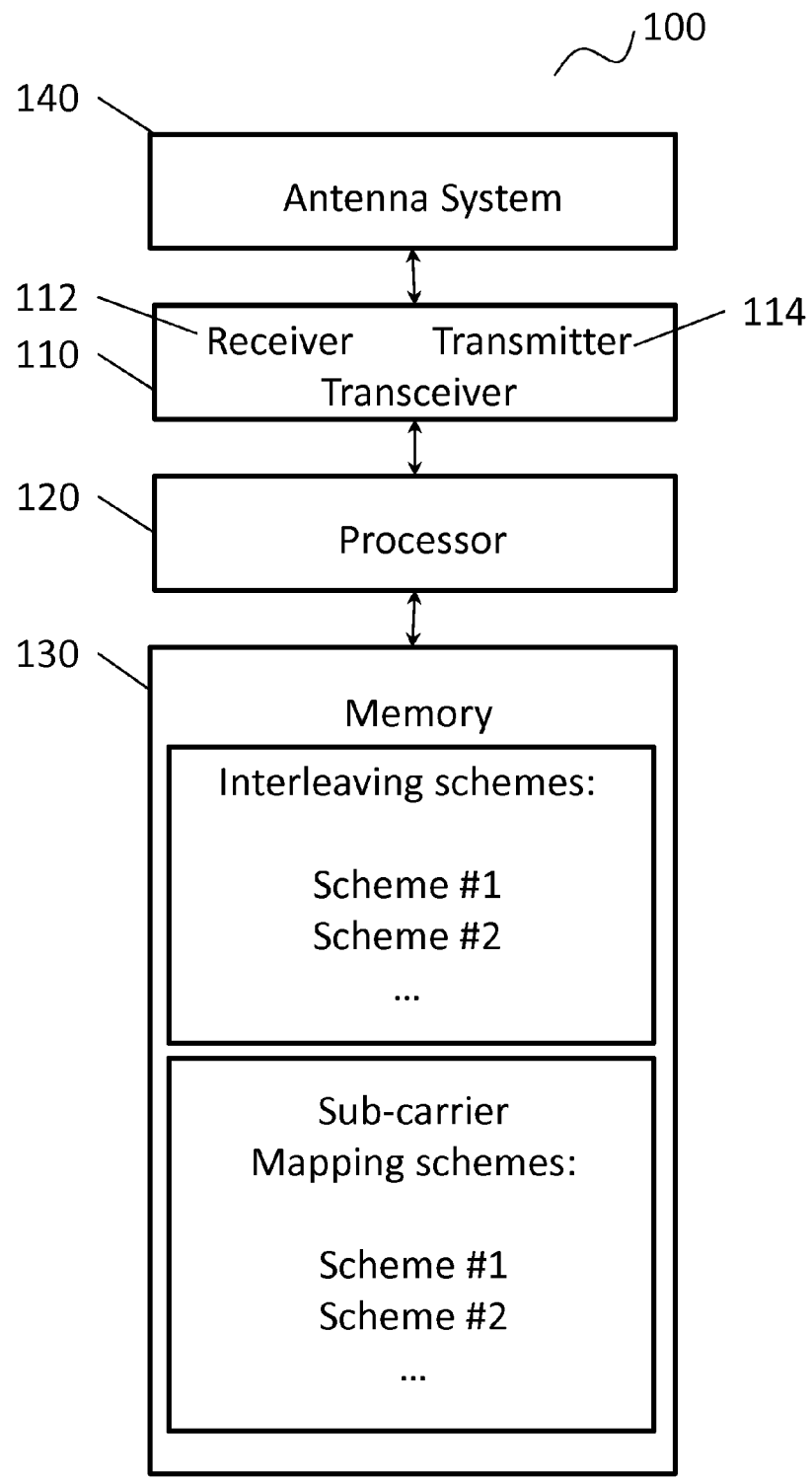
FIG. 1 is a functional block diagram of one embodiment of a wireless device.

FIG. 1 is a functional block diagram of a wireless device 100. As will be appreciated by those skilled in the art, one or more of the various "parts" shown in FIG. 1 may be physically implemented using a software-controlled microprocessor, hard-wired logic circuits, or a combination thereof. Also, while the parts are functionally segregated in FIG. 1 for explanation purposes, they may be combined variously in any physical implementation.

Wireless device 100 includes a transceiver 110, processor 120, memory 130, and a directional antenna system 140.

Transceiver 110 includes a receiver 112 and a transmitter 114 and provides functionality for wireless device 100 to communicate with other wireless devices.

Processor 120 is configured to execute one or more software algorithms in conjunction with memory 130 to provide the functionality of wireless device 100. Beneficially, processor 120 includes its own memory (e.g., nonvolatile memory) for storing executable software code that allows it to perform the various functions of wireless device 100. Alternatively, the executable code may be stored in designated memory locations within memory 130.

Beneficially, antenna system 140 may include an omni-directional capability and/or a directional antenna capability.

In one embodiment, a transmitter in a first wireless device transmits a set of data to a second wireless device by employing different interleaving (bit and/or symbol) and/or sub-carrier mapping schemes for different transmissions of the data set, while employing the same error correction coding scheme to encode the data for all transmissions of the data set. That is, the transmitter employs at least one of a first interleaving scheme and a first sub-carrier mapping scheme when transmitting a first set of data bits in a first (original) data packet, and employs at least one of a second interleaving scheme and a second sub-carrier mapping scheme when transmitting the first set of data bits in a second (retransmitted) data packet. Beneficially, this scheme can provide additional frequency diversity without increasing the decoder complexity significantly. Beneficially, this scheme can be employed by transmitter 114 in wireless device 100 in FIG. 1

Figure 2:
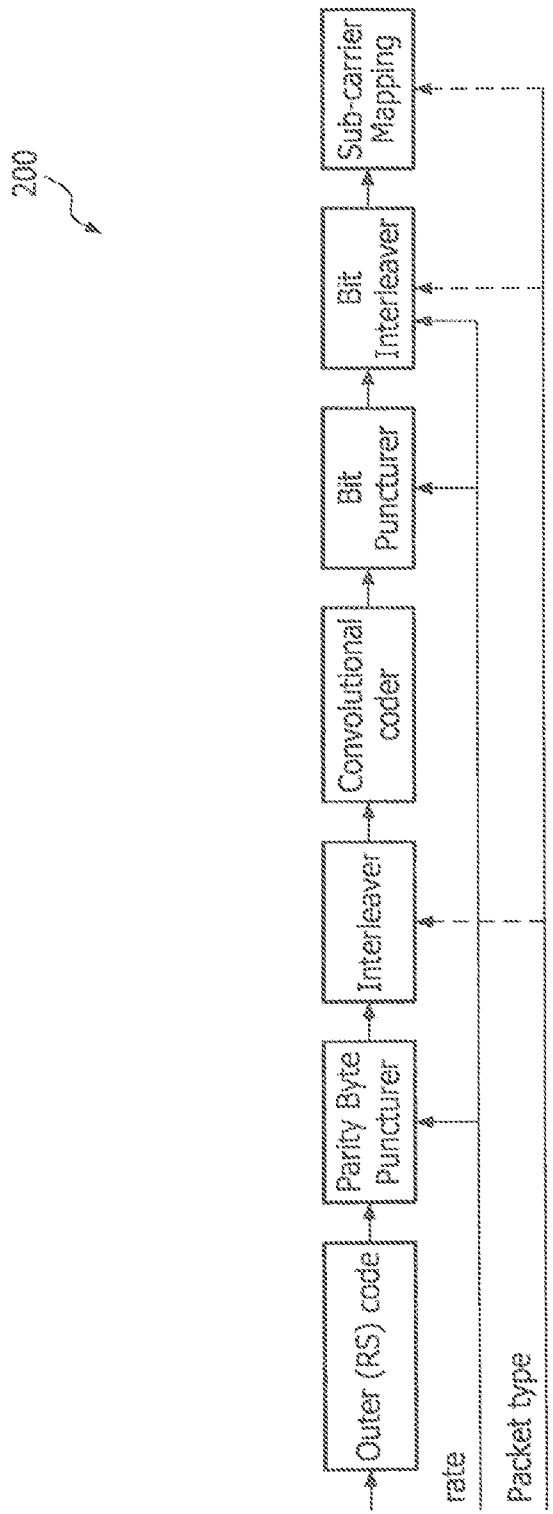
FIG. 2 illustrates a simplified block diagram of one embodiment of a data transmitter.

FIG. 2 shows a simplified block diagram of one embodiment of a transmitter 200. In one embodiment, transmitter 200 may be the same as transmitter 114 of FIG. 1.

In FIG. 2, the parameter "packet type" defines a unique pointer to a particular combination of interleaving and/or mapping schemes to be employed. If the "packet type" parameter indicates that an original packet is being encoded then the transmitter can employ one combination of interleaving and/or mapping schemes. On the other hand, if the "packet type" parameter indicates that the data is being retransmitted, then the transmitter can employ another combination of interleaving and mapping schemes. For example, assuming that the transmitter is adapted to employ two different interleaving schemes and two different mapping schemes, one possible definition of the "packet type" parameter is shown below in Table 1.

TABLE 1

| Packet Type | Bit interleaving scheme | Mapping scheme |
| --- | --- | --- |
| 0 | Scheme # 1 | Scheme # 1 |
| 1 | Scheme # 2 | Scheme # 1 |
| 2 | Scheme # 2 | Scheme # 2 |
| ... | ... | ... |

When the encoding for multiple transmissions of the same data uses different bit interleaving and/or sub-carrier mapping schemes, then the receiver can combine multiple receptions to improve the performance.

A receiver has to determine the '(re)transmission mode' in order to decode the payload information. The '(re)transmission mode' information can be conveyed to the receiver by the transmitter using a variety of different methods. Two such methods include: (1) Unique signature sequences; and (2) '(re)transmission mode' field in the header.

The first method involves the transmission of unique signature sequences corresponding to the different (re)transmission modes in the preamble portion. This provides maximum gains as the header and the payload will be transmitted using the same scheme. The drawback of this scheme is that it increases receiver complexity as the receiver has to correlate the received signal against all signature sequences.

The second method involves transmitting the '(re)transmission mode' field in the header. The advantage of this scheme is that it avoids receiver complexity that is associated with the unique signature sequences schemes described above. The header is always transmitted using a pre-defined scheme while the payload is transmitted using different schemes as determined by the '(re)transmission mode' field. As the result, the header field will not be able to maximize the benefits of the proposed method and therefore this method has some performance loss. However, header is normally encoded in a more robust rate than payload counterpart so that the performance loss would not be significant.

To facilitate a better understanding of these principles, an exemplary case will now be described.

First, consider an OFDM system with 128 sub-carriers out of which 104 sub-carriers are defined as data sub-carriers. All encoded data bits are interleaved by a block interleaver with a block size corresponding to the number of bits in a single OFDM symbol, $N_{CBPS}$. The interleaver ensures that adjacent coded bits are mapped onto non-adjacent sub-carriers.

If we denote by k the index of the coded bit before the interleaver and by i the index after the interleaver, just prior to modulation mapping. Then interleaver scheme #1 could be defined by the rule:

$$i = (N_{CBPS}/13)(k \bmod 13) + \text{floor}(k/13) \, k = 0, 1, \ldots, N_{CBPS}-1 \quad (1)$$

The function floor (.) denotes the largest integer not exceeding the parameter. Meanwhile, interleaver scheme #2 could be defined by the rule:

$$i = (N_{CBPS}/8)(k \bmod 8) + \text{floor}(k/8) \, k = 0, 1, \ldots, N_{CBPS}-1 \quad (2)$$

At the receiver, the soft-metrics for the different packet transmissions can be stored and combined in the convolutional decoder to optimally decode the original data.

Figure 3:
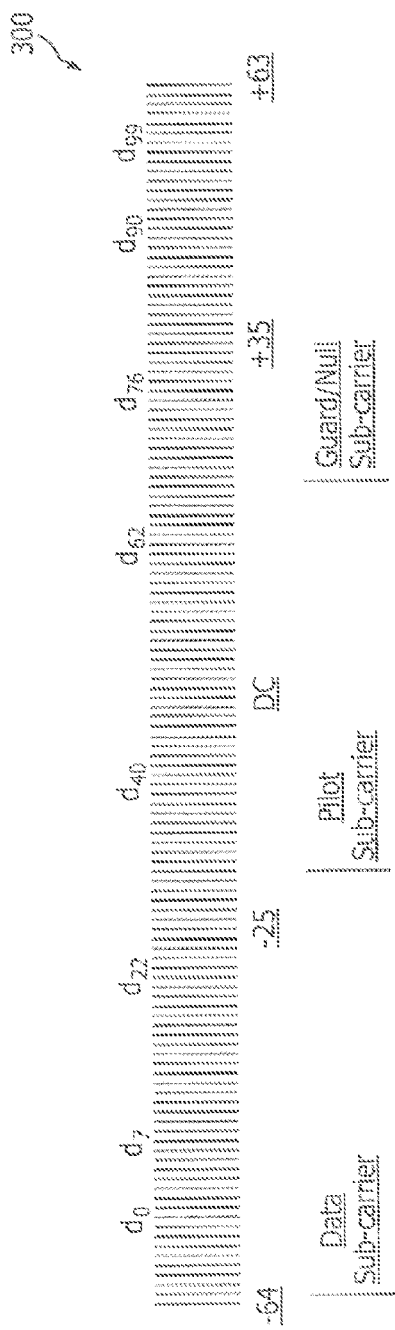
FIG. 3 illustrates one embodiment of a sub-carrier mapping scheme for transmitting a data packet in an orthogonal frequency division multiplex (OFDM) system.

FIG. 3 illustrates one embodiment of a sub-carrier mapping scheme 300 for transmitting data in a first data packet in an orthogonal frequency division multiplex (OFDM) system with 128 sub-carriers. The complex data symbols are mapped, using scheme #1, to the data sub-carriers starting from the first one on the lower band-edge. At the receiver, the complex data is recovered from the received symbols as shown below:

$$\hat{d}_m = \hat{H}_k R_k \, k \in \{\text{set of data sub-carriers}\} \quad (3)$$

where m is a function of k. $m = f(k)$, $R_k$ and $\hat{H}_k$ represent the received symbol and channel frequency response estimate respectively for sub-carrier k.

Figure 4:
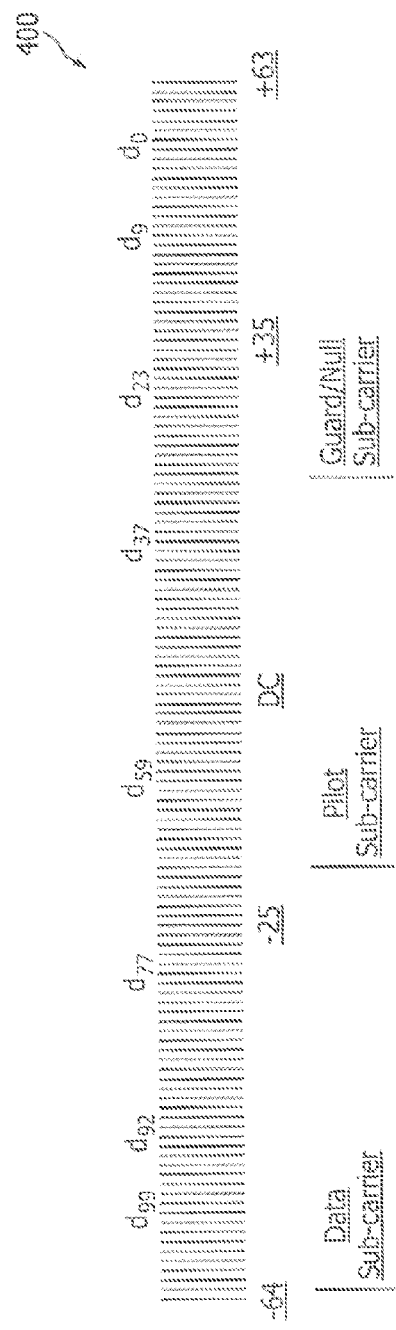
FIG. 4 illustrates one embodiment of a sub-carrier mapping scheme for retransmitting a data packet in an OFDM system.

For instance: $\hat{d}_0 = \hat{H}_{-56} R_{-56}$ and $\hat{d}_{62} = \hat{H}_{14} R_{14}$ FIG. 4 illustrates one embodiment of a sub-carrier mapping scheme 40 for retransmitting data in a second data packet in an OFDM system. In this case, the complex data is recovered from the received symbols as:

$$\hat{d}_{m'} = \hat{H}_k R_k \, k \in \{\text{set of data sub-carriers}\} \quad (4)$$

where m' is a function of k. $m' = f^{(1)}(k)$.

In this mapping scheme: $\hat{d}_0 = \hat{H}_{+56} R_{+56}$ and $\hat{d}_{62} = \hat{H}_{-14} R_{-14}$ If the receiver is capable of combining the symbols from the first (original) data packet and the second (retransmitted) data packet then we have:

$$\hat{d}_m = \hat{H}_k R_{1,k} + \hat{H}_k R_{2,k} \, k, k' \in \{\text{set of data sub-carriers}\} \quad (5)$$

where $R_{1,k}$ and $R_{2,k}$ represent, respectively, the received symbols in the first data packet and the second data packet.

For instance, in the example above: $\hat{d}_0 = \hat{H}_{-56} R_{1,-56} + \hat{H}_{+56} R_{2,+56}$ and $\hat{d}_{62} = \hat{H}_{14} R_{1,14} + \hat{H}_{-14} R_{2,-14}$.

Combining the two symbols as shown in equation (5) improves the frequency diversity of the system. This scheme however requires that the receiver store the packets from previous transmission and therefore involves some additional hardware resources. Alternately, the receiver can also combine corresponding soft bit metrics from the original and retransmitted packets and use them in the convolutional decoder.

The performance of the proposed schemes with the current retransmission schemes is compared through simulations. In the simulation results to follow, an OFDM system with 128 sub-carriers is assumed. The FEC includes a rate-1/2 convolutional code which is punctured to derive different higher rate codes. A bit interleaver is used to interleave the encoded bits which are then mapped using either 16-QAM or 64-QAM modulation schemes. The multipath channel is based on an exponential Rayleigh faded model with number of taps derived based on the RMS delay spread. The receiver uses optimal combining schemes in order to maximize the gains.

Figure 5:
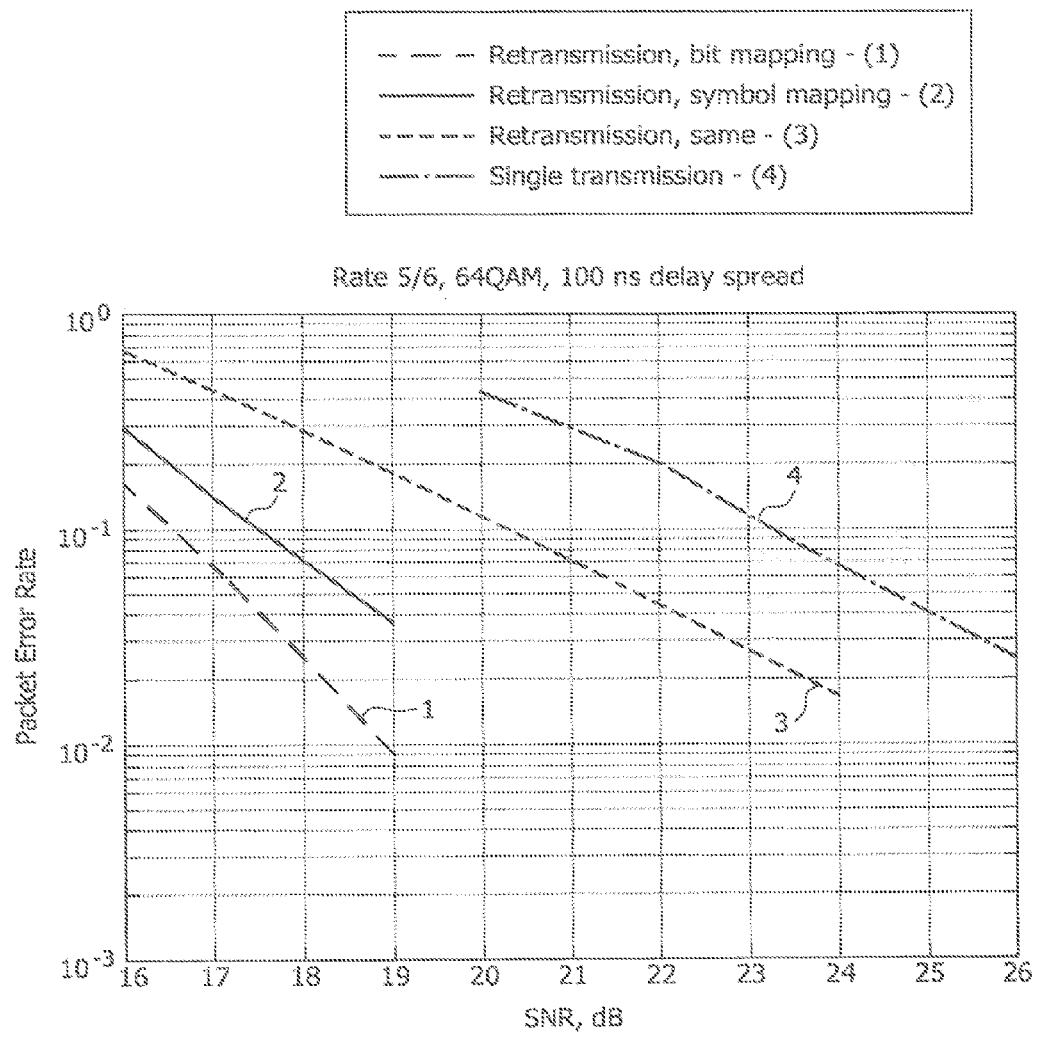
FIG. 5 shows simulated packet error rate (PER) versus signal-to-noise-ratio (SNR) curves for various packet retransmission options in a first multi-path channel.

FIG. 5 shows simulated packet error rate (PER) versus signal-to-noise-ratio (SNR) curves for various packet retransmission options for a system employing a rate-5/6, 64-QAM mode in a first multi-path channel with a 100 ns RMS delay spread. It can be observed that the proposed schemes with modified symbol mapping and bit mapping (interleaving) provides an additional gain of 3.0 dB and 4.5 dB respectively for 4% PER compared to retransmitting the same packet.

Figure 6:
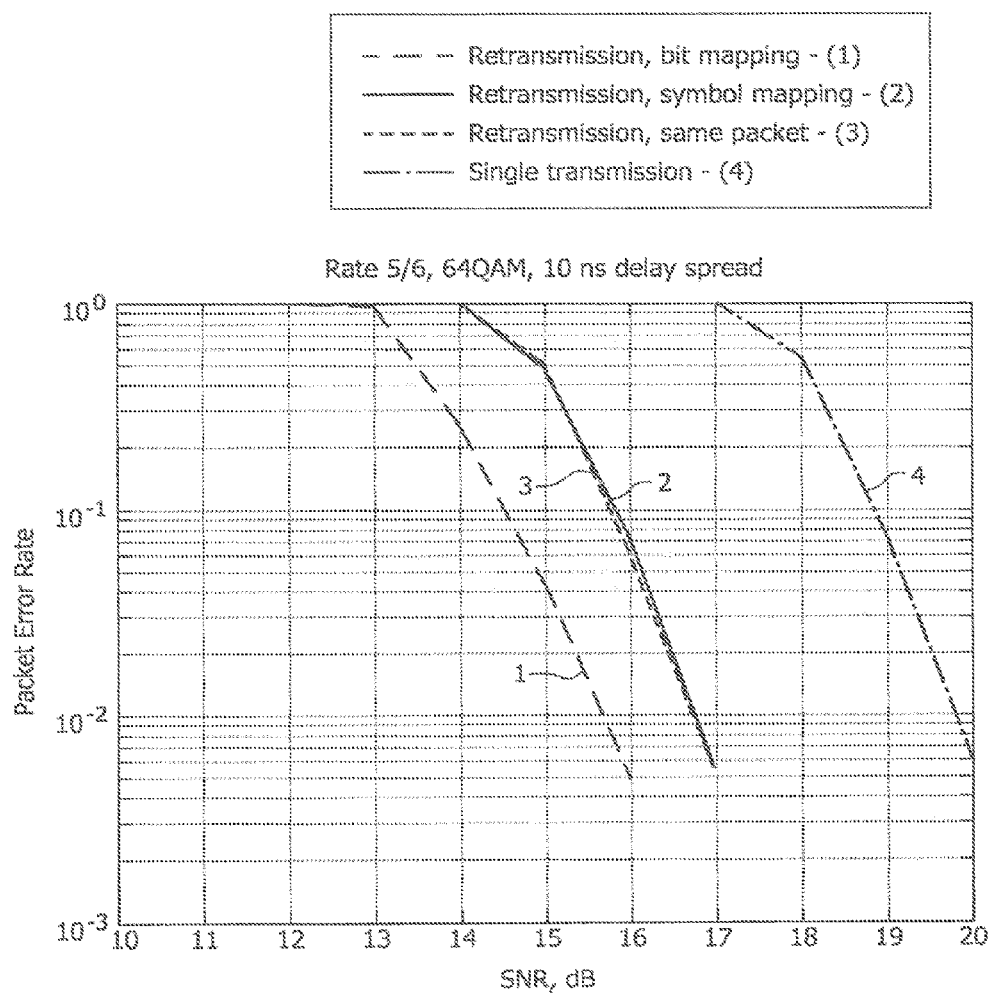
FIG. 6 shows simulated PER versus SNR curves for various packet retransmission options in a second multi-path channel.
Figure 7:
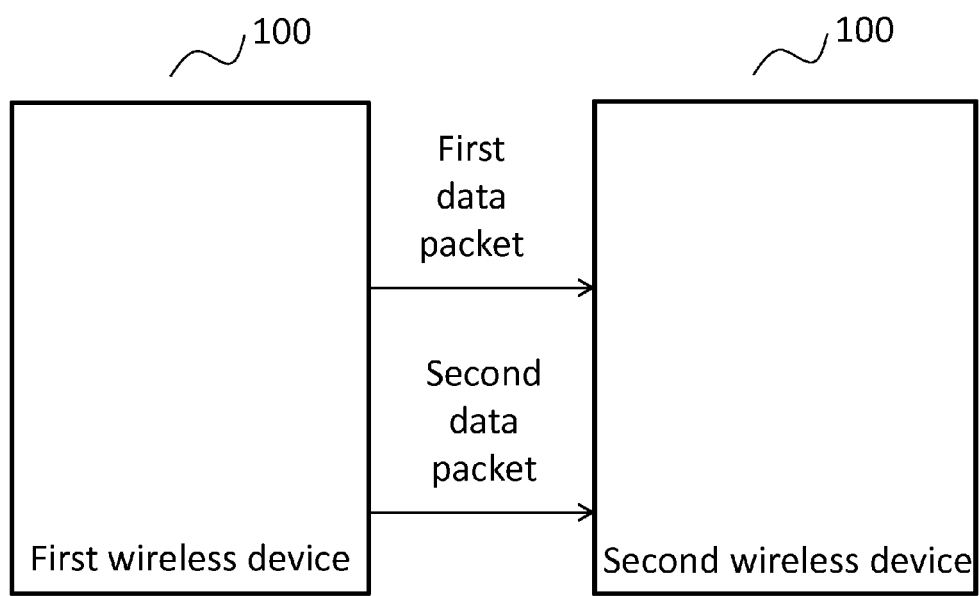
FIG. 7 shows two wireless devices, with the first wireless device sending the first and second data packets to the second wireless device, in accordance with an embodiment of the present invention.
Figure 8:
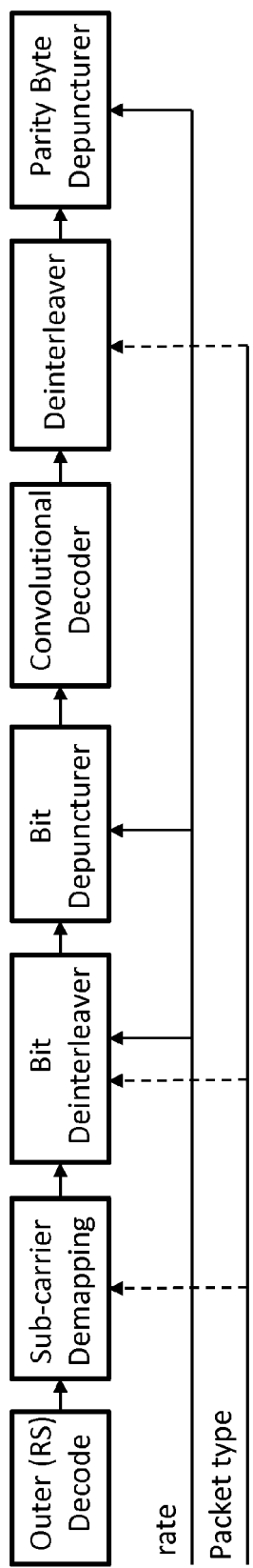
FIG. 8 is a flow diagram showing the second wireless device receiving data from the first wireless device in accordance with an embodiment of the present invention.

FIG. 6 shows simulated PER versus SNR curves for various packet retransmission options in a second multi-path channel with a 10 ns RMS delay spread. It can be observed that the modified bit mapping scheme provides 1 dB gain at 1% PER even in this channel.

While preferred embodiments are disclosed herein, many such variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of communicating data from a first wireless device to a second wireless device, the method comprising:
    employing a first set of schemes comprising a first interleaving scheme and a first sub-carrier mapping scheme to produce a first data packet from a first plurality of data bits;
    transmitting the first data packet, including a first transmission mode information indicating that the first set of schemes is employed, to the second wireless device; and
    when the first data packet is not received correctly by the second wireless device, then:
        employing a second set of schemes to create a second data packet from the first plurality of data bits; and
        transmitting the second data packet, including a second transmission mode information indicating that the second set of schemes is employed, to the second wireless device;
    wherein the second set of schemes is different from the first set of schemes in that at least one of the first interleaving scheme is replaced by a second interleaving scheme different from the first interleaving scheme and the first sub-carrier mapping scheme is replaced by a second sub-carrier mapping scheme different from the first sub-carrier mapping scheme; and
    wherein the first wireless device transmits the first transmission mode information in the first data packet, and when the first data packet is not received correctly by the second wireless device, transmits the second transmission mode information in the second data packet to the second wireless device by performing at least one of:
        transmitting unique signature sequences corresponding to the first and the second transmission mode information in a preamble portion of a data packet of which header and payload are transmitted using the same set of schemes; and
        transmitting each of the first and the second transmission mode information in a specific field in a header, which is transmitted using a predefined scheme, while payload is transmitted using a scheme as determined by the specific field corresponding to the first and the second transmission mode information.

2. The method of claim 1, wherein both the first interleaving scheme and the firs sub-carrier mapping scheme are employed to produce the first data packet from a first plurality of data bits, and wherein the first interleaving scheme and the second sub-carrier mapping scheme are employed to produce the second data packet from the first plurality of data bits.

3. The method of claim 1, wherein both the first interleaving scheme and the first sub-carrier mapping scheme are employed to produce the first data packet from a first plurality of data bits, and wherein the second interleaving scheme and the first sub-carrier mapping scheme are employed to produce the second data packet from the first plurality of data bits.

4. The method of claim 1, wherein both the first interleaving scheme and the first sub-carrier mapping scheme are employed to produce the first data packet from a first plurality of data bits, and wherein the second interleaving scheme and the second sub-carrier mapping scheme are employed to produce the second data packet from the first plurality of data bits.

5. A method of receiving data from a first wireless device at a second wireless device, the method comprising:
    receiving a first data packet, including a first transmission mode information indicating that a first set of schemes, comprising a first interleaving scheme and a first sub-carrier mapping scheme, is employed to produce the first data packet from a first plurality of data bits, from the first wireless device;
    decoding the first data packet in accordance with the first set of schemes to create a second plurality of data bits from the first data packet;
    when the first data packet is not received correctly, then:
        receiving a second data packet, including a second transmission mode information indicating that a second set of schemes is employed to produce the second data packet from the first plurality of data bits, from the first wireless device;
        decoding the second data packet in accordance with the second set of schemes to produce a third plurality of data bits from the second data packet;
    wherein the second set of schemes is different from the first set of schemes in that at least one of the first interleaving scheme is replaced by a second interleaving scheme different from the first interleaving scheme and the first sub-carrier mapping scheme is replaced by a second sub-carrier mapping scheme different from the first sub-carrier mapping scheme; and
    wherein the first wireless device transmits the first transmission mode information in the first data packet, and when the first data packet is not received correctly by the second wireless device, transmits the second transmission mode information in the second data packet to the second wireless device by performing at least one of:
        transmitting unique signature sequences corresponding to the first and the second transmission mode information in a preamble portion of a data packet of which header and payload are transmitted using the same set of schemes; and transmitting each of the first and the second transmission mode information in a specific field in a header, which is transmitted using a predefined scheme, while payload is transmitted using a scheme as determined by the specific field corresponding to the first and the second transmission mode information.

6. The method of claim 5, wherein both an inverse of the first interleaving scheme and the inverse of the first sub-carrier mapping scheme are employed to produce the second plurality of data bits from the first data packet, and wherein the inverse of the first interleaving scheme and the inverse of the second sub-carrier mapping scheme are employed to produce the third plurality of data bits from the second data packet.

7. The method of claim 5, wherein both an inverse of the first interleaving scheme and the inverse of the first sub-carrier mapping scheme are employed to produce the second plurality of data bits from the first data packet, and wherein the inverse of the second interleaving scheme and the inverse of the first sub-carrier mapping scheme are employed to produce the third plurality of data bits from the second data packet.

8. The method of claim 5, wherein both an inverse of the first interleaving scheme and the inverse of the first sub-carrier mapping scheme are employed to produce the second plurality of data bits from the first data packet, and wherein the inverse of the second interleaving scheme and the inverse of the second sub-carrier mapping scheme are employed to produce the third plurality of data bits from the second data packet.

9. A wireless device comprising:

a memory configured to store multiple sets of schemes; and
a processor configured to operate a transmitter;
the transmitter being adapted to employ a first set of schemes comprising a first interleaving scheme and a first sub-carrier mapping scheme to create a first data packet from a first plurality of data bits, and to transmit the first data packet, including a first transmission mode information indicating that the first set of schemes is employed, to a second wireless device,
wherein when the first data packet is not received successfully by the second wireless device, then the transmitter is adapted to employ a second set of schemes to create a second data packet from the first plurality of data bits; and to transmit the second data packet, including a second transmission mode information indicating that the second set of schemes is employed, to the second wireless device;
wherein the second set of schemes is different from the first set of schemes in that at least one of the first interleaving scheme is replaced by a second interleaving scheme different from the first interleaving scheme and the first sub-carrier mapping scheme is replaced by a second sub-carrier mapping scheme different from the first sub-carrier mapping scheme; and
wherein the wireless device transmits the first transmission mode information in the first data packet, and when the first data packet is not received correctly by the second wireless device, transmits the second transmission mode information in the second data packet to the second wireless device using at least one of:
unique signature sequences, which are transmitted corresponding to the first and the second transmission mode information in a preamble portion of a data packet of which header and payload are transmitted using the same set of schemes; and
each of the first and the second transmission mode information in a specific field in a header, which is transmitted using a predefined scheme, while payload is transmitted using a scheme as determined by the specific field corresponding to the first and the second transmission mode information.

10. The device of claim 9, wherein the transmitter is adapted to employ both the first interleaving scheme and the first sub-carrier mapping scheme to produce the first data packet from a first plurality of data bits, and wherein the transmitter is adapted to employ the first interleaving scheme and the second sub-carrier mapping scheme to produce the second data packet from the first plurality of data bits.

11. The device of claim 9, wherein the transmitter is adapted to employ both the first interleaving scheme and the first sub-carrier mapping scheme to produce the first data packet from a first plurality of data bits, and wherein the transmitter is adapted to employ the second interleaving scheme and the first sub-carrier mapping scheme to produce the second data packet from the first plurality of data bits.

12. The device of claim 9, wherein the transmitter is adapted to employ both the first interleaving scheme and the first sub-carrier mapping scheme to produce the first data packet from a first plurality of data bits, and wherein the transmitter is adapted to employ the second interleaving scheme and the second sub-carrier mapping scheme to produce the second data packet from the first plurality of data bits.

13. A wireless device, comprising:

a memory configured to store multiple sets of schemes; and
a processor configured to operate a receiver;
the receiver being adapted to receive a first data packet, including a first transmission mode information indicating that a first set of schemes, comprising a first interleaving scheme and a first sub-carrier mapping scheme, is employed to produce the first data packet from a first plurality of data bits, from a second wireless device, the receiver further being adapted to decode the first data packet in accordance with the first set of schemes to create a second plurality of data bits from the first data packet,
wherein when the first data packet is not received correctly, then the receiver is adapted to receive a second data packet, including a second transmission mode information indicating that a second set of schemes is employed to produce the second data packet from the first plurality of data bits, from the second wireless device, and to decode the second data packet in accordance with the second set of schemes to produce a third plurality of data bits from the second data packet;
wherein the second set of schemes is different from the first set of schemes in that at least one of the first interleaving scheme is replaced by a second interleaving scheme different from the first interleaving scheme and the first sub-carrier mapping scheme is replaced by a second sub-carrier mapping scheme different from the first sub-carrier mapping scheme; and
wherein the second wireless device transmits the first transmission mode information in the first data packet, and when the first data packet is not received correctly by the wireless device, transmits the second transmission mode information in the second data packet to the wireless device using at least one of:
unique signature sequences, which are transmitted corresponding to the first and the second transmission mode information in a preamble portion of a data packet of which header and payload are transmitted using the same set of schemes; and each of the first and the second transmission mode information in a specific field in a header, which is transmitted using a predefined scheme, while payload is transmitted using a scheme as determined by the specific field corresponding to the first and the second transmission mode information.

14. The device of claim 13, wherein the receiver is adapted to employ both the inverse of the first interleaving scheme and the inverse of the first sub-carrier mapping scheme to produce the second plurality of data bits from the first data packet, and wherein the receiver is adapted to employ the inverse of the first interleaving scheme and the inverse of the second sub-carrier mapping scheme to produce the third plurality of data bits from the second data packet.

15. The device of claim 13, wherein the receiver is adapted to employ both the inverse of the first interleaving scheme and the inverse of the first sub-carrier mapping scheme to produce the second plurality of data bits from the first data packet, and wherein the receiver is adapted to employ the inverse of the second interleaving scheme and the inverse of the first sub-carrier mapping scheme to produce the third plurality of data bits from the second data packet.

16. The device of claim 13, wherein the receiver is adapted to employ both the inverse of the first interleaving scheme and the inverse of the first sub-carrier mapping scheme to produce the second plurality of data bits from the first data packet, and wherein the receiver is adapted to employ the inverse of the second interleaving scheme and the inverse of the second sub-carrier mapping scheme to produce the third plurality of data bits from the second data packet.

* * * * *